United States Patent
Haerkoenen et al.

(10) Patent No.: US 6,930,149 B2
(45) Date of Patent: Aug. 16, 2005

(54) POLYOLEFIN COMPOSITIONS WITH IMPROVED PROPERTIES

(75) Inventors: Mika Haerkoenen, Porsgrunn (NO); Johannes Wolfschwenger, Niederneukirchen (AT)

(73) Assignee: Borealis GmbH, Schwechat-Mannswoerth (AT)

( * ) Notice: Subject to any disclaimer, the term of this patent is extended or adjusted under 35 U.S.C. 154(b) by 154 days.

(21) Appl. No.: 10/433,202

(22) PCT Filed: Nov. 26, 2001

(86) PCT No.: PCT/EP01/13717
§ 371 (c)(1),
(2), (4) Date: Aug. 28, 2003

(87) PCT Pub. No.: WO02/44272
PCT Pub. Date: Jun. 6, 2002

(65) Prior Publication Data
US 2004/0210002 A1 Oct. 21, 2004

(30) Foreign Application Priority Data
Nov. 29, 2000 (EP) .............................................. 00126051

(51) Int. Cl.$^7$ ............................. C08F 8/00; C08L 23/00; C08L 23/04
(52) U.S. Cl. ........................ 525/191; 525/192; 525/240
(58) Field of Search ................................ 525/191, 192, 525/240

(56) References Cited

U.S. PATENT DOCUMENTS

| 5,331,047 A | 7/1994 | Giacobbe |
| 6,590,034 B2 * | 7/2003 | Wanic et al. ................ 525/191 |
| 6,770,714 B2 * | 8/2004 | Ommundsen et al. ....... 525/191 |

FOREIGN PATENT DOCUMENTS

| EP | 0373660 | 6/1990 |
| EP | 0814127 | 12/1997 |

* cited by examiner

*Primary Examiner*—Nathan M. Nutter
(74) *Attorney, Agent, or Firm*—Jordan and Hamburg LLP

(57) ABSTRACT

The invention relates to polyolefin compositions with good impact strength and transparency comprising a) 85–98 wt % based on the total weight of the composition of a heterophasic propylene/α-olefin copolymer comprising a polymer or copolymer of propylene and an α-olefin with 0–15 mol % of the α-olefin as matrix polymer and a propylene/α-olefin rubber copolymer comprising 20–80 mol % of the α-olefin and b) 15–2 wt % based on the total weight of the composition of an ethylene homopolymer or an ethylene/α-olefin copolymer, the α-olefin in the ethylene copolymer having 4–10 carbon atoms, the ethylene homo- or copolymer having a density lower than 0.925 g/m$^3$.

processes for producing these compositions and their use. The compositions are particularly useful for food packaging, especially for deep freezing applications.

17 Claims, No Drawings

POLYOLEFIN COMPOSITIONS WITH IMPROVED PROPERTIES

The invention relates to polyolefin compositions with improved impact strength and improved optical properties. More particularly the invention relates to polyolefin compositions, especially polypropylene compositions with improved impact strength at temperatures below room temperature, especially at temperatures below 0° C., having improved optical properties, especially higher transparency and lower haze.

The compositions of the inventions are particularly useful for packaging applications, especially for food packaging for deep freezing application.

BACKGROUND OF THE INVENTION

Polypropylene homopolymers are widely used in packaging applications. Polypropylene homopolymers show balanced properties and are cheap, easily decomposable polymers, but they show poor transparency and low impact strength.

It has been suggested to improve the poor optical properties and the impact strength of polypropylene homopolymers by adding nucleating agents and/or clarifiers. Sutiable nucleating agents are for example talcum, disorbitol, organic phosphates and the like.

Nevertheless the desired properties of propylene homopolymers cannot be improved to the extent desired, namely to show high impact strength at low temperatures.

Compositions with improved impact strength and improved optical properties are for example propylene/α-olefin random copolymers, wherein the α-olefin is ethylene or an α-olefin with 4–10 carbon atoms. Although transparency is higher and impact strength is improved considerably at ambient temperature, impact strength at lower temperature, i.e. 0° C. and below is still not satisfying. Propylene/α-olefin random copolymers have a ductile to brittle transition temperature between −5° C. and 5° C. depending on the monomer content and therefore impact strength at lower temperatures is still very poor.

To improve the impact strength at lower temperatures heterophasic polymer compositions have been suggested. Heterophasic polymers are polymers having a matrix phase (phase 1) and a second phase. The matrix phase is usually a polypropylene homopolymer or polypropylene/α-olefin copolymer phase and the second phase is usually a propylene/α-olefin rubber polymer.

The polymers of the second phase have low glass transition temperatures, usually below −30° C. Therefore impact strength of such heterophasic systems is rather satisfying, even for deep freezing applications. A major drawback is the poor transparency due mostly due to big rubber particles in the heterophasic system.

Several attempts have been made to improve the transparency of heterophasic polymer systems.

EP-B 0 373 660 discloses heterophasic polymer systems with improved impact strength and improved transparency an elastomeric propylene/ethylene as matrix phase and a phase 2 being propylene/α-olefin rubber, wherein the intrinsic viscosity ratio between phase 1 and phase 2 has to be a defined value, namely 0.2. Therefore the heterophasic system of the disclosure of EP B 0 373 660 is restricted to very special combinations of phase 1 and 2 polymers.

EP-A 0 814 127 discloses embrittlement resistant polyolefin compositions and flexible articles thereof based on propylene homopolymers or propylene/α-olefin copolymers and elastomeric copolymers of ethylene with propylene or butene-1. The elastomeric copoylmeres enhance the flexibility without affecting the clarity of the polymer composition, which is not at least satisfying for packaging applications, although these compositions are claimed to be used for the production of medical articles and food packaging material.

EP B 0 593 221 discloses polypropylene resin compositions comprising polypropylenes of defined MFR and ethylene/α-olefin copolymers with good balance between impact strength and rigidity and high moldability useful for automotive parts. These compositions do not have good optical properties, especially low transparency and high haze.

OBJECT OF THE INVENTION

It is an object of the invention to provide polypropylene compositions for packaging applications with improved impact strength at ambient and low temperatures having improved optical properties, especially good transparency and low haze.

A further object of the invention is a process for producing polypropylene compositions for packaging applications with improved impact strength at low temperatures and good optical properties.

It is still a further object of the invention to provide articles made of these polypropylene compositions useful for packaging applications, especially for food packaging for deep freezing applications.

BRIEF DESCRIPTION OF THE DRAWING

The object of the invention has been solved by providing heterophasic polymer systems which are modified by a modifier which shows improved impact strength as well as improved optical properties.

The invention therefore relates to polyolefin compositions with good impact strength and transparency comprising
a) 85–98 wt % based on the total weight of the composition of a heterophasic propylene/α-olefin copolymer comprising a polymer or copolymer of propylene and an α-olefin with 0–15 mol % of the α-olefin as matrix polymer and a propylene/α-olefin rubber copolymer comprising 20–80 mol % of the α-olefin
b) 15–2 wt % based on the total weight of the composition of an ethylene homopolymer or an ethylene/α-olefin copolymer, the α-olefin in the ethylene copolymer having 4–10 carbon atoms, the ethylene homo- or copolymer having a density lower than 0.925 g/m$^3$.

DETAILED DESCRIPTION OF THE INVENTION

Component a) is preferably a heterophasic propylene/α-olefin copolymer comprising a polymer or a copolymer of propylene with 0–15 mol % of an α-olefin as matrix polymer (phase 1 polymer) and a propylene/α-olefin rubber copolymer comprising 20–80 mol % of the α-olefin.

Preferably the molecular weight of the propylene/α-olefin rubber is equal or lower than the molecular weight of the propylene homopolymer resp. the polypropylene/α-olefin copolymer.

The heterophasic polymer of component a) may be produced by multistage process polymerisation of polypropylene or polypropylene and α-olefin such as bulk polymerisation, gas phase polymerisation, slurry polymerisation, solution polymerisation or combinations thereof using conventional catalysts. Those processes are well known to one skilled in the art.

A preferred process is a combination of a bulk slurry loop reactor(s) and gas phase reactor(s). The matrix polymer can be made either in loop reactors or in a combination of loop and gas phase reactor.

The polymer produced in this way is transferred into another reactor and the propylene/α-olefin rubber is polymerised. Preferably this polymerisation step is done in a gas phase polymerisation.

A suitable catalyst for the polymerisation of the heterophasic copolymer is any stereospecific catalyst for propylene polymerisation which is capable of polymerising and copolymerising propylene and comonomers at a temperature of 40 to 110° C. and at a pressure form 10 to 100 bar. Ziegler Natta catalysts as well as metallocene catalysts are suitable catalysts.

One skilled in the art is aware of the various possibilities to produce such heterophasic systems and will simply find out a suitable procedure to produce suitable heterophasic polymer systems which are used in the present invention.

The matrix polymers of the heterophasic polymers of component a) may have a ratio of matrix polymer (polymer of phase 1) to polymer of phase 2 of about 97:3 to 80:20, preferably 95:5 to 90:10.

The heterophasic polymer shows a melt flow rate of about 0.1 to 200 g/10 min, preferably 0.2 to 50 g/10 min, more preferable 0.3 to 20 g/10 min according to ISO 1133. The ethylene content of the matrix polymer may be up to 7 mol % and the overall ethylene content of the heterophasic polymer of component a) may be up to 30 mol %, preferably up to 15 mol %.

The polymer of component a) preferably has a flexural modulus of higher than 500 MPa (DIN 53457).

Component b) is an ethylene homopolymer or an ethylene/α-olefin copolymer the α-olefin having 4–10 carbon atoms.

For example component b) may be a low density ethylene homopolymer or a copolymer of ethylene with for example vinylacetate or butylacrylate or the like. The amount of component b) is 2–15 wt % based on the total weight of the composition, preferably 3–10 wt %, most preferably 4–7 wt %.

Preferably the density of the low density ethylene homo- or copolymer (component b)) is lower than 0.925 g/cm$^3$ according to ISO 1183. More preferably the density of the low density ethylene homo- or copolymer is lower than 0.920 g/cm$^3$. Most preferably the density is 0.890–0.920 g/cm$^3$.

Preferably the ethylene-homo- or copolymer (component b)) should have a substantially higher melt flow rate (MFR) (temperature: 190° C.; load: 2.16 kg) than the heterophasic polymer of component a) under melting and blending conditions. Preferably the melt flow rate of component b) is at least two times, more preferably at least five times higher than the melt flow rate of component a). MFR's of component b) are determined at a temperature of 190° C. and a load of 2.16 kg. MFR's of component a) are determined at a temperature of 230° C. and a load of 2.16 kg.

Those ethylene homo- or copolymers may be produced in a high pressure tubular process or in a high pressure autoclave process.

Alternatively, a linear low density type ethylene copolymer may be produced in a low pressure process typically with a Ziegler type catalyst. Further the polymers of component b) may be produced using a metallocene catalyst. The polymers of component b) produced by using metallocene catalysts are typically elastic copolymers of ethylene and butene or octane having a density of preferably 0.890–0.915 g/cm$^3$.

The compositions of the present invention may further comprise conventional additives, such as antioxidants, stabilisers, acid scavengers, clarifying agents, coloring agents, anti-UV agents, nucleating agents, antistatic agents, slip/mould release agents, fillers, like nanofillers, etc. Typically these additives may be present at less than 2 wt % each, more preferably less than 0.5 wt % relative to the total weight of the composition.

Examples of such conventional additives include Irganox 1010 and Irgafos 168 (commercially available stabilizers form Ciba Speciality Chemicals), calcium stearate and synthetic hydrotalcite (e.g. DHT-4A from Kyowa Chemical Industry) and 1,2:3,4-di(ethylbenzylidene)sorbitol—EBDS (e.g. NC-4 from Mitsui Toatsu and 1,3:2,4 bis(3,4-dimethylbenzylidene)sorbitol—DMBDS (e.g. Millad 3988 from Milliken Chemicals).

The polypropylene composition of the present invention is preferably clarified. Clarified polypropylenes ca be produced for example by adding clarifying or nucleating agents, for examples sorbitol derivatives such as EDBS, MDBS (1,3:2,7-di(methylbenzylidene)sorbitol and DMDBS, phosphate salts, such as for example sodium 2,2'-methylenebis (4,6-di-tertiarbutylphenyl)phosphate, polyvinylcylohexane etc. Typically such clarifying or nucleating agents may result in haze levels after injection moulding of lower than 60%, preferably lower than 40% in 2 mm injection moulding sheets.

The polyolefin compositions of the present invention are produced by mixing the heterophasic polymer of component a) with component b) optionally adding conventional additives and/or stabilisers and/or fillers.

Preferably, mixing is done by melt blending in an extruder or another melt blending unit, preferably in a twin screw extruder usually followed by pelletisation. The components may be melt blended as such, or melt blending can be done in the presence of a peroxide component for increasing the melt flow rate of the composition. Then the peroxide, preferably an organic peroxide, which is suitable for degradation of polypropylene (visbreaking) is fed to the blending unit together with components a) and b) or the peroxide may be fed separately into the melt blending unit.

The compositions of the present invention show improved impact strength, especially at temperatures below 0° C. and improved optical properties, especially high transparency and low haze.

The polypropylene composition of this invention can be further converted to an end product by using normal conversion techniques, such as injection moulding, compression moulding, blow moulding (extrusion or injection stretch blow moulding), extrusion (film, sheet, pipe, tuber, profile extrusion), film blowing, thermoforming and the like. Preferably end products are packaging containers made by injection moulding, blow moulding or thermoforming, or packaging films made by film extrusion.

The products are particularly suitable for food packaging applications, especially for deep freezing applications.

It is a still further object of the invention to provide new articles with good impact strength and good optical properties, especially good transparency an low haze.

This object is achieved by using a polyolefin composition comprising a) 85–98 wt % based on the total weight of the composition of a heterophasic propylene/α-olefin copolymer comprising a polymer or copolymer of propylene and an α-olefin with 0–15 mol % of the α-olefin as matrix polymer and a propylene/α-olefin rubber copolymer comprising 20–80 mol % of the α-olefin and b) 15–2 wt % based on the total weight of the composition of an ethylene homopolymer or an ethylene/α-olefin copolymer, the α-olefin in the ethylene copolymer having 4–10 carbon atoms, the ethylene homo- or copolymer having a density lower than 0.925 g/m$^3$, for the production of articles with good impact strength good transparency.

EXAMPLES

Heterophasic Polymers

The heterophasic polymers were produced in a two step process. In the first stage a random propylene/ethylene copolymer was polymerised (polymerisation in liquid propylene) and in the second stage a propylene/ethylene rubber was polymerised. The ratio between the propylene/ethylene random copolymer and the propylene/ethylene rubber was 92:8.

For visbreaking from the basic melt flow rate to a melt flow rate of about 10–15 g/10 min Di-tertiary-butylperoxide was used.

The compositions and the additives were compounded in a twin screw extruder at a temperature of 250° C. The strands were quenched in cold water and pelletized.

The characteristics of the heterophasic polymers are given in table 1.

TABLE 1

| polymer | MFR2 matrix [g/10'] | XCS matrix [wt %] | C2 matrix [mol %] | MFR2 total [g/10'] | XCS total [wt %] | C2 total [mol %] | i..V. XCS [ml/g] | C3/XCS [wt %] |
|---|---|---|---|---|---|---|---|---|
| polymer 1 | 1.09 | 7.2 | 5.6 | 1.22 | 12.2 | 8.5 | 1.38 | 66.0 |
| polymer 2 | 1.13 | 6.7 | 6.3 | 1.27 | 12.0 | 9.8 | 1.65 | 65.0 |
| polymer 3 | 1.13 | 6.7 | 6.3 | 1.19 | 12.1 | 9.2 | 1.59 | 66.0 |
| polymer 4 | 1.05 | 6.6 | 6.0 | 1.12 | 13.3 | 8.4 | 1.70 | 68.5 |

MFR2 matrix: melt flow rate acc. ISO 1133 of phase (1)
XCS matrix: xylene cold soluble fraction of phase (1)
C2 matrix: ethylene content (randomly incorporated) of phase (1)
MFR2 total: melt flow rate acc. ISO 1133 of the heterophasic system (phase 1 + 2)
XCS total: xylene cold soluble fraction of the heterophasic system (phase 1 + 2)
C2 total: total ethylene content of the heterophasic system (phase 1 + 2)
i.V./XCS: intrinsic viscosity of xylene cold soluble fraction (indication of the molecular weight of the propylene/ethylene rubber - phase 2)
C3/XCS: propylene content of xylene cold soluble fraction The polymers were mixed with conventional additives (0.05% Irgafos 168, 0.05% Irganox 1010, 0.1 Ca-stearate, 0.06% Glycerol monostearate, 0.18% Millad 3988) in an intensive mixer (Henschel mixer) for 20 seconds.

Examples 1–4

Polymers 1–4 of table 1 (component a) )were mixed with 5% Exact 2M048, a commercial metallocene catalyst based polyethylene grade of MFR(190° C., 2.16 kg) 10 g/10 min, density 902 g/cm$^3$; DexPlastomers (component b)) was added. For visbreaking from the basic melt flow rate to a melt flow rate of about 10–15 g/10 min Di-tertiary-butylperoxide was used.

The compositions and the additives were compounded in a twin screw extruder at a temperature of 250° C. The strands were quenched in cold water and pelletized. Injection molded test bars were produced and the notched impact strength according to ISO 179 was measured.

For determining optical properties, especially transparency and haze injection molded plaques (60*60*2 mm) were produced. The optical properties were measured according to ASTM D-1003-92.

Comparative Examples 1–4

Heterophasic polymers of table 1 were used as comparative compounds. Impact strength and optical properties were determined as described.

The results are given in table 2.

TABLE 2

| example | polymer | modifier | MFR [g/10'] | NIS/+23° C. 179 1eA/+23° C. [kJ/m²] | IS/−20° C. 179 1eU/−20° C. [kJ/m²] | haze [%] |
|---|---|---|---|---|---|---|
| example 1 | polymer 1 | 5% Exact 2M048 | 12.7 | 11.6 | 77.5 | 28.0 |
| example 2 | polymer 2 | 5% Exact 2M048 | 12.4 | 13.2 | 131.7 | 39.4 |
| example 3 | polymer 3 | 5% Exact 2M048 | 12.5 | 11.8 | 125.9 | 38.5 |
| example 4 | polymer 4 | 5% Exact 2M048 | 12.0 | 11.1 | 130.3 | 43.5 |
| comp. Example 1 | polymer 1 | | 13.8 | 9.4 | 62.9 | 36.0 |
| comp. Example 2 | polymer 2 | | 13.6 | 10.5 | 88.9 | 54.0 |
| comp. Example 3 | polymer 3 | | 13.4 | 9.3 | 75.8 | 53.6 |
| comp. Example 4 | polymer 4 | | 13.0 | 8.8 | 70.4 | 60.6 |

Examples 5–6

Selected heterophasic polymers of table 1 (component a) ) were mixed with 5% Borealis CA9150 (commercial available LDPE grade of MFR(190° C., 2.16 kg) 15 g/10 min, density 915 g/cm³, (component b)).

Comparative example 5 and 6 were prepared without adding component b). The compositions were treated as described above, impact strength and optical properties were determined as described above.

The results are given in table 3.

TABLE 3

| example | polymer | modifier | MFR [g/10'] | NIS/+23° C. 179 1eA/+23° C. [kJ/m²] | IS/−20° C. 179 1eU/−20° C. [kJ/m²] | Haze [%] |
|---|---|---|---|---|---|---|
| example 5 | polymer 2 | 5% Borealis CA 9150 | 13.5 | 10.5 | 108.3 | 40.8 |
| example 6 | poly mer 4 | 5% Boealis CA 9150 | 12.5 | 10.0 | 115.8 | 44.2 |

What is claimed is:

1. Polyolefin compositions with good impact strength and transparency comprising components
   a) 85–98 wt % based on the total weight of the composition of a heterophasic propylene/α-olefin copolymer comprising a polymer or copolymer of propylene and an α-olefin with 0–15 mol % of the α-olefin as matrix polymer and a propylene/α-olefin rubber copolymer comprising 20–80 mol % of the α-olefin and
   b) 15–2 wt % based on the total weight of the composition of an ethylene homopolymer or an ethylene/α-olefin copolymer, the α-olefin in the ethylene copolymer having 4–10 carbon atoms, the ethylene homo- or copolymer having a density lower than 0.925 g/m³,
   wherein melt flow rate of component b) determined at a temperature of 190° C. and a load of 2.16 kg is at least two times higher than melt flow rate of component a) determined at a temperature of 230° C. and a load of 2.16 kg.

2. Polyolefin compositions according to claim 1, comprising
   a) 90–97 wt % of a heterophasic propylene/α-olefin copolymer and
   b) 10–3 wt % of the ethylene homopolymer or ethylene/α-olefin copolymer.

3. Polyolefin compositions according to claim 1 or 2, wherein the matrix polymer of the heterophasic polypropylene/α-olefin copolymer is a propylene/ethylene copolymer and the propylene/α-olefin rubber copolymer is a propylene/ethylene rubber.

4. Polyolefin compositions according to claim 1 or 2, wherein a weight ratio of the matrix polymer to the propylene/α-olefin rubber copolymer is about 97:3 to 80:20.

5. Polyolefin compositions according to claim 1 to 2 wherein component b) is produced by using a metallocene catalyst.

6. Polyolefin compositions according to claim 1 or 2, wherein the ethylene content of the polyolefin composition is up to 15 mol %.

7. Polyolefin compositions according to claim 1 or 2, wherein the melt flow rate of the polyolefin composition is 0.1–200 g/min.

8. Polyolefin compositions according to claim 1 or 2, wherein the melt flow rates are determined under melting and blending conditions.

9. Polyolefin compositions according to claim 1 or 2, further comprising additives and/or stabilizer and/or fillers.

10. Process for producing polyolefin compositions of claim 1 or 2, comprising producing the heterophasic polymer of component a) in a multistage process and mixing said heterophasic polymer with the ethylene homopolymer or the ethylene/α-olefin copolymer of component b).

11. Process according to claim 10, wherein said mixing comprises melt blending in the presence or in the absence of peroxides, copolymer being linear and of low density and produced by a low pressure process with a Ziegler catalyst.

12. Shaped articles comprised of the polyolefin compositions of claim 1 or 2.

13. Polyolefin compositions according to claim 1 or 2, wherein a melt flow rate of the polyolefin compositions is 0.2–50 g/min.

14. Polyolefin compositions according to claim 1 or 2, wherein a melt flow rate of the polyolefin compositions is 0.5–20 g/min.

15. Polyolefin compositions according to claim 1 or 2, wherein said melt flow rate of component b) determined at a temperature of 190° C. and a load of 2.16 kg is at least 5 times higher than said melt flow rate of component a) determined at a temperature of 230° C. and a load of 2.16 kg.

16. Polyolefin compositions according to claim 1 or 2, wherein component b) is produced by a high pressure process.

17. Polyolefin compositions according to claim 1 or 2, wherein component b) is said ethylene/α-olefin copolymer, said ethylene/α-olefin.

* * * * *